United States Patent
Romano, Jr. et al.

(10) Patent No.: US 6,367,922 B2
(45) Date of Patent: *Apr. 9, 2002

(54) INK JET PRINTING PROCESS

(75) Inventors: Charles E. Romano, Jr., Rochester; Elizabeth A. Gallo, Penfield, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,531

(22) Filed: Dec. 18, 1998

(51) Int. Cl.$^7$ ................................................. B41J 2/01
(52) U.S. Cl. ..................... 347/101; 428/195; 106/31.13; 106/31.28
(58) Field of Search ............................ 347/47, 95, 100, 347/101, 105; 428/327, 195, 206, 409, 474.4; 427/288; 106/31.13, 31.28

(56) References Cited

U.S. PATENT DOCUMENTS

| | | | | |
|---|---|---|---|---|
| 4,419,388 A | * | 12/1983 | Sugiyama et al. | 427/288 |
| 4,864,324 A | * | 9/1989 | Shirota et al. | 346/1.1 |
| 5,024,923 A | * | 6/1991 | Suzuki et al. | 430/372 |
| 5,225,313 A | * | 7/1993 | Aono et al. | 430/213 |
| 5,429,860 A | * | 7/1995 | Held et al. | 428/195 |
| 5,474,843 A | * | 12/1995 | Lambert et al. | 428/327 |
| 5,656,378 A | * | 8/1997 | Lambert | 428/478.2 |
| 5,733,672 A | * | 3/1998 | Lambert | 428/708 |
| 5,885,343 A | * | 3/1999 | Cernigliaro et al. | 106/482 |

FOREIGN PATENT DOCUMENTS

| | | | | |
|---|---|---|---|---|
| EP | 1010539 | * | 6/2000 | 347/101 |
| JP | 10-219157 | | 8/1998 | |

* cited by examiner

*Primary Examiner*—Eugene Eickholt
(74) *Attorney, Agent, or Firm*—Harold E. Cole

(57) ABSTRACT

An ink jet printing process for improving the water-fastness of an ink jet image comprising: providing an ink jet recording element having a support having thereon an image-recording layer comprising a cross-linkable polymer of gelatin or acetoacetylated poly(vinyl alcohol) and a mordant; applying liquid ink droplets of an anionic, water-soluble dye on the image-recording layer in an image-wise manner; and applying an aqueous solution of a hardener to the image to cross-link the binder.

9 Claims, No Drawings

INK JET PRINTING PROCESS

CROSS REFERENCE TO RELATED APPLICATIONS

Reference is made to commonly-assigned copending U.S. patent application Ser. No. 09/215,711, filed Dec. 18, 1998 now U.S. Pat. No. 6,170,944, entitled "Ink Jet Printing Process", of Romano, Jr., et al; and Copending U.S. patent application Ser. No. 09/216,558, filed Dec. 18, 1998, now U.S. Pat. No. 6,142,621 entitled "Ink Jet Printing Process", of Romano, Jr., et al; and Copending U.S. patent application Ser. No. 09/216,149, filed Dec. 18, 1998 now U.S. Pat. No. 6,156,110, entitled "Ink Jet Composition", of Romano, Jr., et al; and Copending U.S. patent application Ser. No. 09/216,653, filed Dec. 18, 1998, entitled "Ink Jet Printing Process", of Kovacs et al; and Copending U.S. patent application Ser. No. 09/216,288 filed Dec. 18, 1998 now U.S. Pat. No. 6,276,791, entitled "Ink Jet Printing Process", of Kovacs et al; and Copending U.S. patent application Ser. No. 09/216,350, filed Dec. 18, 1998 now U.S. Pat. No. 6,206,517, entitled "Ink Jet Printing Process", of Kovacs et al; and Copending U.S. patent application Ser. No. 09/216,147, filed Dec. 18, 1998 now U.S. Pat. No. 6,139,611, entitled "Ink Jet Ink Composition", of Kovacs et al; and Copending U.S. patent application Ser. No. 09/216,203 now U.S. Pat. No. 6,224,202, filed Dec. 18, 1998, entitled "Ink Jet Printing Method", of Romano, Jr., et al; and Copending U.S. patent application Ser. No. 09/216,304, filed Dec. 18, 1998 now U.S. Pat. No. 6,137,514, entitled "Ink Jet Printing Method", of Kovacs et al; and Copending U.S. patent application Ser. No. 09/083,875, filed May 22, 1998, now U.S. Pat. No. 6,161,929 entitled "Inkjet Images on PVA Overcoated with Hardener Solution", of Erdtmann et al.; and Copending U.S. patent application Ser. No. 09/083,605 filed May 22, 1998, now U.S. Pat. No. 6,045,219 entitled "Ink Jet Prints Overcoated with Hardener", of Erdtmann et al., the teachings of which are incorporated herein by reference.

FIELD OF THE INVENTION

This invention relates to an ink jet printing process for improving the water-fastness of an ink jet image formed from an aqueous ink containing an anionic dye.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

DESCRIPTION OF RELATED ART

JP 10-219157 relates to an ink jet ink comprising an aqueous medium, a colorant and a very small amount of glutaraldehyde as a biocide.

There is a problem with using this ink, however, in that when it is printed on an image-recording element, the resultant image has poor water-fastness.

It is an object of this invention to provide an ink jet printing process for improving the water-fastness of an ink jet image formed from an aqueous ink containing an anionic dye. It is another object of this invention to provide an ink jet printing process wherein a hardener is applied to improve the water-fastness of the ink jet image. It is another object of the invention to provide an ink jet printing process where the laydown of the hardener applied can be precisely controlled independently of ink laydown and can be applied non-imagewise to the entire element.

SUMMARY OF THE INVENTION

These and other objects are achieved in accordance with the present invention which comprises an ink jet printing process for improving the water-fastness of an ink jet image comprising:

a) providing an ink jet recording element comprising a support having thereon an image-recording layer comprising a cross-linkable polymer of gelatin or acetoacetylated poly(vinyl alcohol) and a mordant;

b) applying liquid ink droplets of an anionic, water-soluble dye on the image-recording layer in an image-wise manner; and c) applying an aqueous solution of a hardener to the image to cross-link the binder.

It was found that when an aqueous solution containing a hardener is applied to an anionic dye-based ink image where the image-receiving layer has a cross-linkable binder and a mordant, that the water-fastness of the image is improved.

DETAILED DESCRIPTION OF THE INVENTION

This process offers an advantage over incorporating a hardener in an ink since the hardener can be applied in both imaged and non-imaged areas, and the laydown can be precisely controlled independent of ink laydown.

Any hardener can be used in the invention provided it cross-links the cross-linkable binder employed. Hardeners may be used at concentrations ranging from 0.10 to 5.0 weight percent of active ingredient in the aqueous solution, preferably 0.25 to 2.0 weight percent. This aqueous hardener solution is applied so that the final coverage of the hardener is from about 0.00002 g/m$^2$ to about 0.001 g/m$^2$, preferably from about 0.00005 g/m$^2$ to about 0.0004 g/m$^2$.

The aqueous hardener solution may also contain, if desired, co-solvents, humectants, surfactants, and other ingredients commonly added to ink jet inks.

Examples of hardeners that can be employed in the invention fall into several different classes such as the following (including mixtures thereof):

a) formaldehyde and compounds that contain two or more aldehyde functional groups such as the homologous series of dialdehydes ranging from glyoxal to adipaldehyde including succinaldehyde and glutaraldehyde; diglycolaldehyde; aromatic dialdehydes, etc.;

b) blocked hardeners (substances usually derived from the active hardener that release the active compound under appropriate conditions) such as substances that contain blocked aldehyde functional groups, such as tetrahydro-4-hydroxy-5-methyl-2(1H)-pyrimidinone polymers, polymers of the type having a glyoxal polyol reaction product consisting of 1 anhydroglucose unit: 2 glyoxal units, dimethoxylethanal-melamine non-formaldehyde resins, 2,3-dihydroxy-1,4-dioxane, blocked dialdehydes and N-methylol compounds obtained from the condensation of formaldehyde with various aliphatic or cyclic amides, ureas, and nitrogen heterocycles;

c) active olefinic compounds having two or more olefinic bonds, especially unsubstituted vinyl groups, activated by adjacent electron withdrawing groups, such as divinyl ketone; resorcinol bis(vinylsulfonate); 4,6-bis(vinylsulfonyl)-m-xylene; bis(vinylsulfonylalkyl) ethers and amines; 1,3,5-tris(vinylsulfonyl) hexahydro-s-triazine; diacrylamide; 1,3-bis(acryloyl)urea; N,N'-bismaleimides; bisisomaleimides; bis(2-acetoxyethyl) ketone; 1,3,5-triacryloylhexahydro-s-triazine; and blocked active olefins of the type bis(2-acetoxyethyl) ketone and 3,8-dioxodecane-1,10-bis(pyridinium perchlorate) bis(vinyl sulfonylmethane), bis(vinyl sulfonylmethyl ether), and the like;

d) compounds that contain two or more amino groups such as ethylene diamine; and e) inorganic salts such as aluminum sulfate; potassium and ammonium alums of aluminum; ammonium zirconium carbonate; chromium salts such as chromium sulfate and chromium alum; and salts of titanium dioxide, zirconium dioxide, etc.

Specific examples of hardeners useful in the invention include the following (in wt. %):

Hardener 1: bis(vinyl sulfonylmethane) (Eastman Kodak Company), 1% solution

Hardener 2: bis(vinyl sulfonylmethyl ether) (Eastman Kodak Company), 1% solution Hardener 3: glyoxal, 1% and 2% solutions Hardener 4: glutaraldehyde, 2% solution Hardener 5: 2,3-dihydroxy-1,4-dioxane (Aldrich Chemical Co.), 0.25%, 0.5%, 1%, 2%, 3%, 4% and 5% solutions Hardener 6: a glyoxal polyol reaction product consisting of 1 anhydroglucose unit: 2 glyoxal units, SEQUAREZ® 755 (Sequa Chemicals, Inc.) 2% solution Hardener 7: a cyclic urea glyoxal condensate consisting of 1 cyclic urea unit: 1 glyoxal unit, SUNREZ® 700M (Sequa Chemicals, Inc.), 2% solution Hardener 8: dimethoxylethanal-melamine non-formaldehyde resin, Sequa CPD3086-100 (Sequa Chemicals, Inc), 2% solution Hardener 9: ethylene diamine, 1% and 2% solutions Hardener 10: aluminum sulfate, 1% solution Any anionic, water-soluble dye may be used in the invention such as a dye having an anionic group, e.g., a sulfo group or a carboxylic group. The anionic dye may be any acid dye, direct dye or reactive dye listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference. In a preferred embodiment, the anionic, water-soluble dye which may be used in the invention is a metallized azo dye, a non-metallized azo dye, a xanthene dye, a metallophthalocyanine dye or a sulfur dye. Mixtures of these dyes may also be used. The dye may be present in an amount of from about 0.1 to about 10% by weight, preferably from about 0.25 to about 3% by weight.

Any mordant can be used in the invention provided it produces the desired result of fixing the anionic dye. For example, there may be used a cationic polymer, e.g., a polymeric quarternary ammonium compound, or a basic polymer, such as poly(dimethylaminoethyl)methacrylate, polyalkylenepolyamines, and products of the condensation thereof with dicyanodiamide, amine-epichlorohydrin polycondensates; divalent Group II metal ions; lecithin and phospholipid compounds. In a preferred embodiment of the invention, the following mordants are employed:

Mordant 1 vinylbenzyl trimethyl ammonium chloride/ethylene glycol dimethacrylate (Eastman Kodak Company)

Mordant 2 poly(diallyl dimethyl ammonium chloride) (Aldrich Chemical Co.)

Mordant 3 poly(2-N,N,N-trimethylammonium)ethyl methacrylate methosulfate (Eastman Kodak Company)

Mordant 4 poly(3-N,N,N-trimethylammonium)propyl methacrylate chloride, Polycare® 133 (Rhone-Poulenc Co.)

Mordant 5 copolymer of vinylpyrrolidinone and vinyl(N-methylimidazolium chloride, Luviquat® FC-550 (BASF Corporation)

Mordant 6 hydroxyethylcellulose derivitized with (3-N,N,N-trimethylammonium)propyl chloride, Celquat® SC-240C (National Starch Co.)

The mordant used in the invention may be employed in any amount effective for the intended purpose. In general, good results are obtained when the mordant is present in an amount of from about 0.5 to about 5 g/m$^2$.

As noted above, the cross-linkable polymer employed in the invention is gelatin or acetoacetylated poly(vinyl alcohol). Gelatin which may be used include the conventional lime-processed ossein, acid-processed ossein or pig skin gelatin. In addition, there are a variety of chemically-modified gelatins formed by reacting the amino group of lysine which can be used. Some functional groups that have been added to gelatin include: phthalate, phenylcarbamyl, succinyl, carbamyl, lauryl, and dodecenyl succinyl. There can also be used quaternized gel, silanol modified gel, and graft copolymers of gel with poly(styrene sulfonate), poly (vinylpyrrolidone), and poly(methacrylic acid).

The acetoacetylated poly(vinyl alcohol) useful in the invention is described in U.S. Pat. No. 4,350,788, the disclosure of which is hereby incorporated by reference. These materials are available commercially as Gohsefimer® Z-200 from Nippon Gohsei.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV- absorbing agents; mildew-proofing agents; mordants; antistatic agents, anti-oxidants, optical brighteners, and the like.

Ink jet inks used in the process of the present invention are well-known in the art. The ink compositions used in ink jet printing typically are liquid compositions comprising a solvent or carrier liquid, dyes, humectants, organic solvents, detergents, thickeners, preservatives, conductivity enhancing agents, anti-kogation agents, drying agents, defoamers, etc. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols.

A carrier can be present in the ink jet ink and can vary widely, depending on the nature of the ink jet printer for which the inks are intended. For printers which use aqueous inks, water, or a mixture of water with miscible organic co-solvents, is the preferred carrier medium. Co-solvents (0–20 wt. % of the ink) are added to help prevent the ink from drying out or crusting in the orifices of the printhead or to help the ink penetrate the receiving substrate. Preferred co-solvents for the inks employed in the present invention include glycerol, ethylene glycol, propylene glycol, 2-methyl-2,4-pentanediol, and diethylene glycol, and mixtures thereof, at overall concentrations ranging from 5 to 20 wt. % of the ink.

The aqueous hardener solution may be applied to the ink jet image in accordance with the invention in a non-imagewise manner either through a separate thermal or piezoelectric printhead, or by any other method which would apply the hardener solution evenly to the image, such as a spray bar. Methods of applying a hardener solution are disclosed in commonly-owned U.S. patent application Ser. No. 09/083,673 filed May 22, 1998, entitled "Printing Apparatus With Spray Bar For Improved Durability" of Wen et al. and U.S. patent application Ser. No. 09/083,876, filed May 22, 1998, entitled "Ink Jet Printing Apparatus With Print Head For Improved Image Quality" of Wen et al., the disclosures of which are incorporated herein by reference.

The support for the ink jet recording element used in the invention can be any of those usually used for ink jet receivers, such as paper, resin-coated paper, poly(ethylene terephthalate), poly(ethylene naphthalate) and microporous materials such as poly polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861.

The support used in the invention may have a thickness of from about 50 to about 500 $\mu$m, preferably from about 75 to 300 $\mu$m. Antioxidants, antistatic agents, plasticizers and other known additives may be incorporated into the support, if desired. In a preferred embodiment, paper is employed.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 $\mu$m.

The image-recording layer may be present in any amount which is effective for the intended purpose. In general, good results are obtained when it is present in an amount of from about 5 to about 30 g/m$^2$, preferably from about 8 to about 15 g/m$^2$, which corresponds to a dry thickness of about 5 to about 30 $\mu$m, preferably about 8 to about 15 $\mu$m.

The following examples are provided to illustrate the invention.

EXAMPLES

Example 1

A photographic grade, polyethylene resin-coated paper was given a corona discharge treatment and then coated with an imaging layer of 8.6 g/m$^2$ of acetoacetylated poly(vinyl alcohol), Gohsefimer® Z-200 (Nippon Gohsei) and in some cases, 7.7 g/m$^2$ of Gohsefimer® Z-200 and 0.9 g/m$^2$ of Mordant 1 as indicated in Table 1. The coatings were applied using a extrusion hopper and air dried.

A Hewlett-Packard ink cartridge (HP 51649A) containing anionic dyes was obtained. The cyan ink contained a mixture of Direct Blue 199 and Acid Blue 9 (6:1 by weight). The magenta ink contained a mixture of Reactive Red 180 and Acid Red 52 (5.6:1 by weight). The yellow ink contained Basacid 132. These inks are described in U.S. Pat. No. 5,536,306, the disclosure of which is incorporated herein by reference.

Cyan, magenta, and yellow patches were then printed on the receivers at 50% laydown using a Hewlett-Packard Printer (HP692C) and the above cartridge.

A control element did not have any hardener solution applied. The remaining elements were then over-printed at D-max with a Hewlett-Packard Printer (HP692C) equipped with a Hewlett-Packard (HP 51649A) ink cartridge filled with a hardener solution containing 16 wt % diethylene glycol and 0.5 wt % Surfonyl® 465 (Air Products Co.) surfactant and the hardener identified in Table 1 and allowed to air dry overnight.

The elements were then immersed in distilled water for 1 hour and then allowed to air dry overnight. The optical density was measured before and after immersion in water. Water-fastness is measured as the percent retained optical density after immersion in water. Values closest to 100% are preferred. Values over 100% indicate an undesirable "dot spread". The following results were obtained:

TABLE 1

| | | | % Retained Optical Density After Water Test | | |
|---|---|---|---|---|---|
| Element | Mordant 1 | Hardener | Cyan | Magenta | Yellow |
| 1 | Yes | None | * | * | * |
| 2 | No | 1 | 16 | 26 | 2 |
| 3 | No | 2 | 28 | 0 | 0 |
| 4 | No | 3 | 28 | 26 | 2 |
| 5 | No | 4 | 31 | 47 | 2 |
| 6 | No | 5 | 31 | 40 | 2 |
| 7 | No | 6 | 25 | 35 | 2 |
| 8 | No | 7 | 24 | 36 | 2 |
| 9 | No | 8 | 17 | 35 | 2 |

TABLE 1-continued

| Element | Mordant 1 | Hardener | % Retained Optical Density After Water Test | | |
|---|---|---|---|---|---|
| | | | Cyan | Magenta | Yellow |
| 10 | No | 9 | 39 | 59 | 7 |
| 11 | Yes | 1 | 100 | 98 | 89 |
| 12 | Yes | 3 | 101 | 98 | 81 |
| 13 | Yes | 4 | 100 | 100 | 91 |
| 14 | Yes | 5 | 102 | 102 | 88 |
| 15 | Yes | 6 | 100 | 99 | 86 |
| 16 | Yes | 7 | 100 | 97 | 86 |
| 17 | Yes | 8 | 114 | 102 | 94 |
| 18 | Yes | 9 | 95 | 99 | 83 |
| 19 | Yes | 5(0.25%) | 96 | NA | NA |
| 20 | Yes | 5(0.5%) | 94 | NA | NA |
| 21 | Yes | 5(1%) | 91 | NA | NA |
| 22 | Yes | 5(2%) | 93 | NA | NA |
| 23 | Yes | 5(3%) | 92 | NA | NA |
| 24 | Yes | 5(4%) | 89 | NA | NA |
| 25 | Yes | 5(5%) | 94 | NA | NA |

*Coating dissolved

The above data show that an ink jet image obtained in accordance with the invention has superior water-fastness (numbers closest to 100%) as compared to control elements without a mordant but over-printed with a hardener solution and control elements with a mordant but not over-printed with a hardener solution.

Example 2

Example 1 was repeated except that Gohsefimer® Z-320 (Nippon Gohsei) acetoacetylated poly(vinyl alcohol) was employed instead of Gohsefimer® Z-200 and Mordant 2 was employed instead of Mordant 1. The elements were tested as in Example 1 with the following results:

TABLE 2

| Element | Mordant | Hardener | % Retained Optical Density After Water Test | | |
|---|---|---|---|---|---|
| | | | Cyan | Magenta | Yellow |
| 26 | Yes | None | * | * | * |
| 27 | No | 1 | 19 | 29 | 6 |
| 28 | No | 2 | 24 | 0 | 0 |
| 29 | No | 3 | 24 | 29 | 4 |
| 30 | No | 4 | 27 | 50 | 5 |
| 31 | No | 5 | 24 | 46 | 4 |
| 32 | No | 6 | 23 | 37 | 5 |
| 33 | No | 7 | 23 | 43 | 6 |
| 34 | No | 8 | 20 | 36 | 5 |
| 35 | No | 9 | 40 | 59 | 10 |
| 36 | Yes | 1 | 102 | 96 | 95 |
| 37 | Yes | 3 | 113 | 112 | 97 |
| 38 | Yes | 4 | 109 | 125 | 104 |
| 39 | Yes | 5 | 130 | 126 | 106 |
| 40 | Yes | 6 | 109 | 115 | 99 |
| 41 | Yes | 7 | 110 | 110 | 98 |
| 42 | Yes | 8 | 122 | 113 | 101 |
| 43 | Yes | 9 | 121 | 121 | 96 |

*Coating dissolved

The above data show that an ink jet image obtained in accordance with the invention has superior water-fastness (numbers closest to 100%) as compared to control elements without a mordant but over-printed with a hardener solution and control elements with a mordant but not over-printed with a hardener solution.

Example 3

Example 1 was repeated except that Goshsefimer Z-200 was replaced with lime-processed bone gelatin and Mordant 1 was replaced with various mordants as described in Table 3. The elements were tested as in Example 1 but only the cyan image was measured. The following results were obtained:

TABLE 3

| Element | Mordant | Hardener | % Retained Optical Density After Water Test Cyan |
|---|---|---|---|
| 44 | 1 | None | 153 |
| 45 | 1 | 10 | 94 |
| 46 | 1 | 1 | 99 |
| 47 | 1 | 5 | 99 |
| 48 | 1 | 9 | 97 |
| 49 | 1 | 3 | 91 |
| 50 | 3 | None | 185 |
| 51 | 3 | 10 | 143 |
| 52 | 3 | 1 | 92 |
| 53 | 3 | 5 | 94 |
| 54 | 3 | 9 | 97 |
| 55 | 3 | 3 | 89 |
| 56 | 4 | None | 173 |
| 57 | 4 | 10 | 142 |
| 58 | 4 | 1 | 105 |
| 59 | 4 | 5 | 105 |
| 60 | 4 | 9 | 100 |
| 61 | 4 | 3 | 95 |
| 62 | 5 | None | 176 |
| 63 | 5 | 10 | 153 |
| 64 | 5 | 1 | 88 |
| 65 | 5 | 5 | 89 |
| 66 | 5 | 9 | 106 |
| 67 | 5 | 3 | 78 |
| 68 | 6 | None | 154 |
| 69 | 6 | 10 | 158 |
| 70 | 6 | 1 | 98 |
| 71 | 6 | 5 | 107 |
| 72 | 6 | 9 | 89 |
| 73 | 6 | 3 | 88 |

The above data show that an ink jet image obtained in accordance with the invention has superior water-fastness (numbers closest to 100%) as compared to control elements which were not over-printed with a hardener solution.

Example 4

Example 3 was repeated except that the lime-processed bone gelatin was replaced with pigskin gelatin. The following results were obtained:

TABLE 4

| Element | Mordant | Hardener | % Retained Optical Density After Water Test Cyan |
|---|---|---|---|
| 74 | 1 | None | 132 |
| 75 | 1 | 10 | 124 |
| 76 | 1 | 1 | 93 |
| 77 | 1 | 5 | 99 |
| 78 | 1 | 9 | 102 |
| 79 | 1 | 3 | 90 |

The above data show that an ink jet image obtained in accordance with the invention has superior water-fastness (numbers closest to 100%) as compared to control elements which were not over-printed with a hardener solution.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet printing process for improving the waterfastness of an ink jet image comprising the following steps in order:
   a) providing an ink jet recording element comprising a support having thereon an image-recording layer comprising a cross-linkable binder of gelatin or acetoacetylated poly(vinyl alcohol) and a mordant;
   b) applying liquid ink droplets of an anionic, water-soluble dye on said image-recording layer in an image-wise manner; and
   c) applying an aqueous solution of a hardener to said image to cross-link said binder, said hardener being selected from the group consisting of formaldehyde and compounds that contain two or more aldehyde functional groups, blocked hardeners, active olefinic compounds having two or more olefinic bonds, and compounds that contain two or more amino groups.

2. The process of claim 1 wherein said solution of a hardener is applied by means of an ink jet print head.

3. The process of claim 1 wherein said support is paper.

4. The process of claim 1 wherein said cross-linkable binder is present in an amount of from about 5 to about 30 $g/m^2$.

5. The process of claim 1 wherein said mordant is a cationic mordant or a basic polymer.

6. The process of claim 1 wherein said mordant is present in an amount of from about 0.5 to about 5 $g/m^2$.

7. The process of claim 1 wherein said anionic dye is a metallized azo dye, a non-metallized azo dye, a xanthene dye, a metallophthalocyanine dye or a sulfur dye.

8. The process of claim 1 wherein an amount of said aqueous solution of hardener is applied so that the final coverage of said hardener is from about 0.00002 $g/m^2$ to about 0.001 $g/m^2$.

9. The process of claim 1 wherein said liquid ink has a water carrier.

* * * * *